April 12, 1932.  G. W. HAVERSTICK  1,853,899
CLINKER REMOVER
Filed Feb. 7, 1931
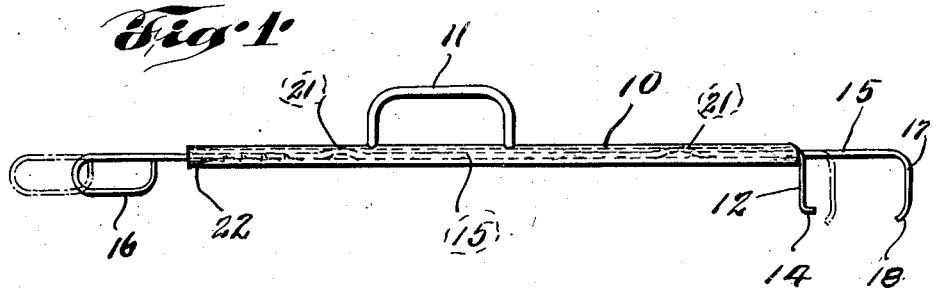
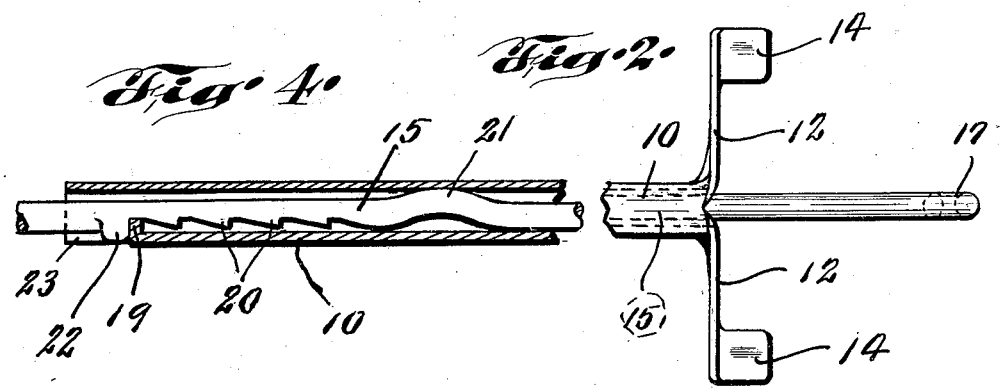
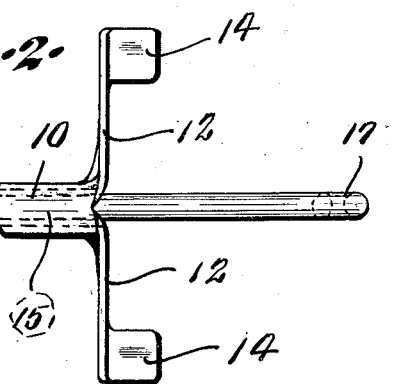
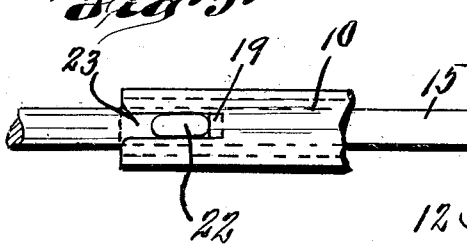
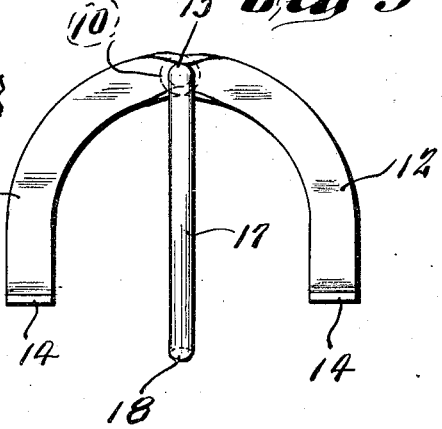
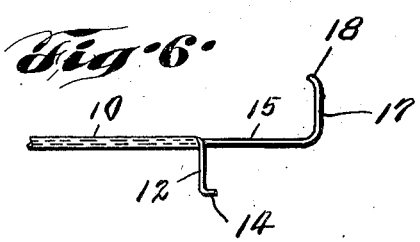
INVENTOR
George W. Haverstick
By William James
ATTORNEY Patented Apr. 12, 1932

1,853,899

UNITED STATES PATENT OFFICE

GEORGE W. HAVERSTICK, OF CLAYTON, MISSOURI

CLINKER REMOVER

Application filed February 7, 1931. Serial No. 514,100.

This invention relates to a combination clinker remover and poker for furnaces.

The objects of the invention are to provide a tool of the class described comprising two members, one of which is movable longitudinally relatively to the other, each of said members being provided at one end with one or more fingers disposed laterally to the axis of the tool and arranged in opposed relation with each other whereby clinkers of various sizes can be gripped between said fingers and removed from the furnace.

Further objects of the invention are to provide a combined clinker remover and poker consisting of a tubular member provided at one end with a plurality of fixed fingers disposed laterally to said tubular member and to provide a movable member slidably extending through said tubular member and provided on one end with a finger which is arranged in opposed relation with said fixed fingers and is movable relatively thereto, said movable member being provided at the opposite end with a handle for actuating said movable member relatively to said tubular member.

With these and other objects in view, my invention consists in certain novel features of construction and arrangement of parts, hereinafter more fully described and claimed, and illustrated in the acompanying drawings, in which—

Figure 1 is a side elevational view of my improved device.

Figure 2 is an enlarged top plan view of one end of said device with portions broken away.

Figure 3 is a front elevational view of the forward end of said device.

Figure 4 is an enlarged detail cross section showing the means for locking the two members against revoluble movement.

Figure 5 is a plan view of Figure 4.

Figure 6 is a side elevational view of the forward end of my device showing the movable finger in position to be used as a poker.

Referring by numerals to the accompanying drawings, 10 indicates a tubular member of suitable length and provided near its rear end with a handle 11 and having its opposite or forward end bifurcated to provide a pair of fingers 12 which are disposed laterally from said members and are spaced suitable distance from each other. The ends 14 of these fingers are bent at right angles thereto and extend forwardly a suitable distance parallel with the axis of said tubular member.

A movable member 15 is slidably mounted in member 10 and projects beyond the ends thereof. The rear end of member 15 terminates in a handle 16, while the forward end is provided with a hook 17 which is bent laterally and is of substantially the same length as fingers 12. The end 18 of hook 17 is bent rearwardly in opposed relation to the ends 14 of fingers 12.

When the device is used as a clinker remover, the movable member 15 occupies extended position as shown in Figure 1 with the hook 17 occupying remote position with respect to fingers 12. When a clinker is located between fingers 12 and hook 17, member 15 is moved rearwardly so as to bring hook 17 toward fingers 12, thereby gripping the clinker therebetween so that it can be removed from the furnace. The ends 14 of fingers 12 and 18 of hook 17 hold the clinker securely therebetween so that it cannot slip from its position during its removal from the furnace.

When it is desired to use the device as a poker, movable member 15 is moved rearwardly a suitable distance to permit half a turn so as to bring hook 17 in upward position with respect to fingers 12 as shown in Figure 6.

In using the device as a poker, the fingers 12 are presented upwardly so that they do not interfere with the operation of the hook 17.

Preferably tubular member 10 is of greater inside diameter than the diameter of movable member 15 so that the latter can be moved laterally within said tubular member. The rear end of tubular member 10 is provided with an inwardly projection 19 which is adapted to be engaged by a series of forwardly presented ratchet teeth 20 formed in the underside of member 15 near the rear end thereof. These teeth are so arranged that the rod can be moved rearwardly to grip a clinker between fingers 12 and 17 but prevent accidental forward movement of said movable rod. To release the rod the rear end thereof is pressed upwardly so as to bring the ratchet teeth 20 clear of projection 19. This rear end of the rod is held downwardly by one or more bends or jogs 21 formed in the length of said rod and presented in opposite direction to said ratchet teeth, as shown in Figures 1 and 4. These bends engage the upper face of the bore of member 10 and resiliently maintain the ratchet teeth in engagement with projection 19. Rod 15 is preferably provided with a depending lug 22 which when said rod occupies outermost position bears against projection 19, thereby forming a stop for said rod. This lug when in this position occupies slot 23 formed by up-ending portion 19 thereby holding rod 15 against rotative movement when in this position.

My improved device is of simple but sturdy construction, is highly efficient in performing its intended functions, and is light in weight so that it can be easily handled.

I claim:

1. A clinker remover of the class described comprising a tubular member provided near one end with a handle and provided at the other end with a pair of spaced-apart fingers disposed laterally to the axis thereof, the ends of said fingers being rebent forwardly, and a movable member slidably mounted in said tubular member and projecting beyond the ends thereof, one end of said slidable member being provided with a handle and the other with a hook, the end of which is bent in opposed relation to the ends of said fingers, said slidable member being operable to bring said hook to and from said fingers so as to grip a clinker therebetween, said slidable member being partially rotatable to bring said hook on the opposite side of said fingers whereby said hook can be used as a poker, said slidable member being provided near its rear end and to one side with a plurality of ratchet teeth for engaging said end of said tubular member and lock said slidable member in retracted position, the opposite side of said slidable member being provided with a raised portion spaced from said ratchet teeth for bearing against the opposite side of said tubular member and force said teeth into locking engagement, said slidable member being resilient and adapted to be distorted to cause disengagement of said ratchet teeth from the rear end of said tubular member.

2. In a device of the class described, the combination of a tubular member provided near one end with a handle and having the other end bifurcated to form a pair of spaced-apart fingers disposed laterally to the axis thereof, and a movable member slidably mounted in said tubular member and projecting beyond the ends thereof, the rear end of said slidable member being provided with a handle and the other end with a hook which is presented in opposed relation to said fingers and adapted to be moved relatively thereto by the actuation of said slidable member, said slidable member being partially rotatable to position said hook on the other side of the longitudinal axis with respect to said fingers whereby the device can be used as a poker, said tubular member being provided with an inwardly projecting shoulder and said slidable member being formed resilient and provided with a tooth for engaging said shoulder whereby said slidable member is locked against longitudinal movement in one direction.

3. In a device of the class described, the combination of a tubular member provided with a handle and having its forward end bifurcated to form a pair of spaced-apart fingers disposed laterally to the axis thereof, a movable member revolubly and slidably mounted in said tubular member and projecting beyond the ends thereof, the rear end of said movable member being provided with a handle and the forward end with a hook which is presented in opposed relation to said fingers and adapted to be moved relatively thereto by the actuation of said movable member, the latter being partially rotatable to bring the hook on the opposite side of the longitudinal axis of the device, whereby said hook can be used as a poker, and a radial projection on said movable member adjacent to the handle thereof, said radial projection being adapted when said movable member is moved into extended position to engage a slot formed in the rear end of said tubular member so as to lock said movable member against rotation.

4. A clinker remover comprising a tubular member provided at one end with a pair of spaced-apart fingers arranged at an angle to the axis thereof, a movable member slidably arranged in said tubular member and provided at one end with a handle and provided at the other end with a hook which is arranged in opposed relation to said fingers and movable when said slidable member is actuated adjacent to said fingers to grip a clinker therebetween, and means for locking said movable member in retracted position, said locking means comprising a shoulder formed integral with said tubular member at its rear end and a plurality of teeth formed on said slidable member and engageable with said shoulder to prevent forward longitudinal movement of said slidable member, the latter being formed resilient and adapted to be distorted to disengage said teeth from said shoulder.

In testimony whereof I hereunto affix my signature this 22nd day of January, 1931.

GEORGE W. HAVERSTICK.